United States Patent Office 3,305,494
Patented Feb. 21, 1967

3,305,494
OXAZOLIDONYL SULFONES AND METHOD
OF MAKING SAME
Charles H. Schramm, Easton, Pa., and Edward J. Friihauf, Mentor, Ohio, assignors to J. T. Baker Chemical Company, Phillipsburg, N.J., a corporation of New Jersey
No Drawing. Filed Apr. 12, 1963, Ser. No. 272,520
12 Claims. (Cl. 260—2)

This invention relates to 2-oxazolidonyl sulfone compounds. This invention further relates to valuable new poly(2-oxazolidonyl) sulfone resins and to a method for their preparation.

One or more objects of the present invention are accomplished by a method which comprises reacting sulfuryldiisocyanate with an epoxide compound.

The compositions of the present invention produced by the reaction of sulfuryldiisocyanate with an epoxide compound having a single oxirane group are simple addition products. These products are useful as chemical intermediates and in the manufacture of resins and plastics.

These low molecular weight addition products can be illustrated by the following reaction scheme between sulfuryldiisocyanate and ethylene oxide producing bis(2-oxazolidon-3-yl) sulfone:

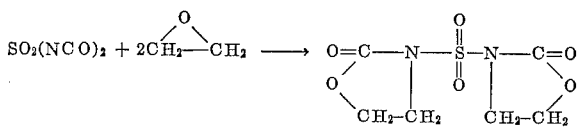

The compositions of the present invention produced by the reaction of sulfuryldiisocyanate with an epoxide compound having two or more oxirane groups are polymeric derivatives. These new polymers are generally characterized as hard, tough resins having excellent heat stability. They are useful in coating and potting applications. Resins of this invention can be employed for coating wires and encapsulating electronic devices and the like. The thermoplastic polymers of the present invention generally have the advantage of extremely high melting points.

These invention polymers can be illustrated by the following reaction scheme between sulfuryldiisocyanate and butadiene dioxide:

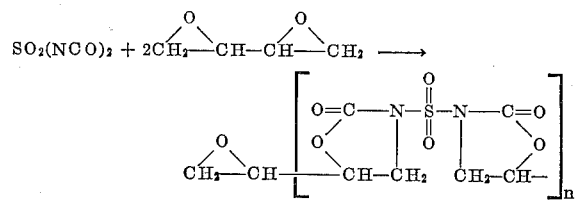

The term "epoxide" as used herein refers to an organic compound having one or more oxirane groups, i.e.,

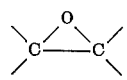

Preferred epoxide reactants for use in the practice of the present invention are those corresponding to the general formula

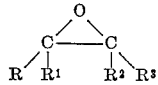

where R, $R^2$, and $R^3$ are members selected from the group consisting of hydrogen, alkyl, cycloalkyl, aryl, alkaryl, aralkyl, and alkenyl radicals having from one to twenty carbon atoms, and $R^1$ is the same radical as R, $R^2$, and $R^3$ above, and additionally can be the epoxy radical:

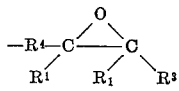

where $R^1$ and $R^2$ are as defined above, and $R^4$ is an aliphatic or aromatic radical containing zero to about twenty carbon atoms, and $R^1$ and $R^2$ taken together can be an alkylene radical of three or four carbon atoms length which is part of a carbocyclic ring.

The preferred epoxide reactants contain from one up to about four reactive oxirane groups and have a total carbon content up to about forty atoms. The epoxide reactants in addition to carbon, hydrogen, and oxygen, can contain nitrogen, sulfur, silicon, titanium, phosphorus, halogen, and the like.

Illustrative of the radicals R, $R^1$, $R^2$, and $R^3$ are methyl, ethyl, isopropyl, 2-ethylhexyl, decyl, lauryl, cyclopropyl, cyclohexyl, chlorocyclohexyl, cyclopentyl, fluorocyclopentyl, furanyl, thienyl, phenyl, nitrophenyl, bromophenyl, methoxyphenyl, tolyl, xylyl, naphthyl, benzyl, phenylethyl, phenylpropyl, phenyldodecyl, vinyl, isopropenyl, 3-butenyl, chloropropenyl, trimethylsilyl, and the like.

Illustrative of $R^4$ are alkylene radicals such as ethylene, propylene, and hexamethylene; alkenylene radicals such as vinylene and butenylene; arylene radicals such as phenylene and xylyene; aryloxy derivatives such as 2,2'-(4-methyleneoxyphenyl)propane, and the like.

Useful epoxide reactants include monoepoxides such as ethylene oxide, propylene oxide, butenyl oxide, butadiene monoepoxide, styrene oxide, epoxycyclohexane, vinylcyclohexane monoepoxide, and the like; diepoxides and other polyepoxides such as 3-methyl-1,5-pentanediol bis(3,4-epoxycyclohexane-carboxylate),
1,5-pentanediol bis(3,4-epoxycyclohexanecarboxylate),
2-methoxymethyl-2,4-dimethyl-1,5-pentanediol bis(3,4-epoxycyclohexanecarboxylate),
ethylene glycol bis(3,4-epoxycyclohexanecarboylate),
2,2-diethyl-1,3-propanediol bis(3,4-epoxycyclohexane-carboxylate),
1,6-hexanediol bis(3,4-epoxycyclohexanecarboxylate),
2-butane1,4-diol bis(3,4-epoxycyclohexanecarboxylate),
2-butene-1,4-diol bis(3,4-epoxy-6-methylcyclohexane-carboxylate),
1,1,1-trimethylolpropane tris(3,4-epoxycyclohexane-carboxylate),
1,2,3-propanetriol tris(3,4-epoxycyclohexanecar-boxylate);

oxyalkylene glycol epoxycyclohexanecarboxylates exemplied by compounds which include dipropylene glycol bis(2-ethylhexyl-4,5-epoxycyclo-hexane-1,2-dicarboxylate),
diethylene glycol bis(3,4-epoxy-6-methylcyclohexane-carboxylate),
triethylene glycol bis(3,4-epoxycyclohexanecar-boxylate);

epoxycyclohexylalkyl epoxycyclohexanecarboxylates explied by compounds which include 3,4-epoxycyclohexylmethyl 3,4-epoxycyclohexane-carboxylate,
3,4-epoxy-1-methylcyclohexylmethyl 3,4-epoxy-1-methylcyclohexanecarboxylate;

3,4-epoxy-2-methylcyclohexylmethyl 3,4-epoxy-2-methylcyclohexanecarboxylate,
(1-chloro-3,4-epoxycyclohexan-1-yl)methyl 1-chloro-3,4-epoxycyclohexanecarboxylate,
(1-bromo-3,4-epoxycyclohexan-1-yl)-methyl 1-bromo-3,4-epoxycyclohexanecarboxylate,
(1-chloro-2-methyl-4,5-epoxycyclohexan-1-yl)methyl 1-chloro-2-methyl-4,5-epoxycyclohexanecarboxylate;

epoxycyclohexylalkyl dicarboxylates exemplified by compounds which include bis(3,4-epoxycyclohexylmethyl)-pimelate,
bis(3,4-epoxy-6-methylcyclohexylmethyl) maleate,
bis(3,4-epoxy-6-methylcyclohexylmethyl) succinate,
bis(3,4-epoxycyclohexylmethyl) oxalate,
bis(3,4-epoxy-6-methylcyclohexylmethyl) sebacate,
bis(3,4-epoxy-6-methylcyclohexylmethyl) adipate;

epoxycyclohexylalkyl phenylenedicarboxylates exemplified by compounds which include bis(3,4-epoxycyclohexylmehtyl) terephthalate,
bis(3,4-epoxy-6-methylcyclohexylmethyl) terephthalate;

epoxycyclohexylalkyl oxyalkylene glycol ethers exemplified by compounds which include bis(3,4-epoxy-6-methylcyclohexylmethyl) diethylene glycol ether; sulfonyldialkanol bis(epoxycyclohexanecarboxylates) exemplified by compounds which include 2,2'-sulfonyldiethanol bis-(3,4 - epoxycyclohexanecarboxylate); epoxycyclohexane-1,2-dicarboximides exemplified by compounds which include N,N' - ethylene bis(4,5-epoxycyclohexane-1,2-dicarboximide); epoxycyclohexylalkyl carbamates exemplified by compounds which include di(3,4-epoxycyclohexylmethyl) 1,3-tolylenedicarbomate; epoxycyclohexylalkyl acetals exemplified by compounds which include bis(3,4-epoxy - 6 - methylcyclohexylmethyl) 3,4-epoxy-6-methylcyclohexanecarboxaldehyde acetal; and epoxycyclohexyl-substituted spirobi(metadioxane) derivatives exemplified by compounds which include 3,9-bis(3,4-epoxycyclohexyl)spirobi(metadioxane); and other polyepoxides such as butadiene dioxide, dicyclopentadiene dioxide, pentaerythritol tetrakis(3 - epoxycyclohexanecarboxylate), diglycidyl ether of 2,2'(4-hydroxyphenyl)propane, divinylbenzene dioxide, and the like.

The preparation of the sulfuryldiisocyanate reactant is described in the chemical literature. In one convenient method sulfuryldiisocyanate is prepared by the reaction of sulfur trioxide with cyanogen bromide.

The novel compounds and polymers of the present invention are produced generally by simply admixing the sulfuryldiisocyanate with the epoxide compound and heating to a temperature sufficient to permit the reaction to proceed at a practical rate.

The sulfuryldiisocyanate and epoxide compound will usually form a single phase system, and in the case where a molded form is being produced, the sulfuryldiisocyanate and epoxide compound are mixed together and poured into the mold area and heated, if necessary, to cause the interaction of reactants to produce a solid resinous molded material. If the polymers of this invention are intended to be used for coating surfaces, then it is convenient to dissolve the sulfuryldiisocyanate and polyepoxide compound in a suitable organic solvent, heating the reaction mixture to form the polymer product, and casting the solution to form a coating in a desired manner. Among the solvents which can be employed are acetone, chloroform, tetrahydrofuran, benzene, pyridine, and the like. Any common solvent having the proper solubility characteristics can be employed, keeping in mind that nowhere in the reaction medium should there be Zerewitinoff active hydrogens since the isocyanato groups of sulfuryldiisocyanate will react instantaneously with any such materials. For this reason the reaction liquid must be kept free of the presence of moisture.

When the sulfuryldiisocyanate and epoxide are admixed at room temperature, in some cases such as for example, when sulfuryldiisocyanate is reacted with ethylene oxide, the addition reaction will proceed slowly with some evolution of heat. The reaction can be driven to completion by heating at a temperature between about 40° C. and 150° C.; preferably the reaction is conducted at the reflux temperature of the solvent if one is used, usually between about 50° C. and 100° C. If it is desirable to accelerate the reaction rate of a particular interaction of sulfuryldiisocyanate and epoxide compound, a catalyst may be employed. A preferred catalyst for this purpose includes trialkyl amines, alkali metal halides, ammonium halides, and the like, such as potassium bromide, sodium bromide, potassium iodide, sodium chloride, potassium fluoride, triethylamine, tributylamine, tetramethylammonium bromide, benzyl triethylammonium bromide, and the like. The quantity of catalyst may vary in a range between about 0.1 up to about 10 percent and higher by weight based on the weight of the sulfuryldiisocyanate.

In the reaction of sulfuryldiisocyanate with a monoepoxide, such as ethylene oxide, the preferred proportions of reactants are at least two moles of monoepoxide per mole of sulfuryldiisocyanate. The two reactants can actually be admixed in any proportion since an excess of any one of the reactants will not be particularly disadvantageous. However, stoichiometrically sulfuryldiisocyanate and monoepoxide react in a ratio of 1 molecule of sulfuryldiisocyanate to 2 molecules of the monoepoxide so that it is convenient to use this particular ratio and include a small excess of ethylene oxide to compensate for side reactions.

Reaction of sulfuryldiisocyanate and a diepoxide proceeds in a 1 to 1 ratio, so any proportions of the reactants approaching this ratio can be conveniently employed. When triepoxides and tetraepoxides and higher epoxides are employed, of course, then the ratio of the materials has to be adjusted on an equivalent weight basis, i.e., the quantities of sulfuryldiisocyanate and polyepoxide will be employed in a quantity inversely proportional to their functionality.

As mentioned hereinabove, the thermoplastic polymers of the present invention, such as those produced by the reaction of sulfuryldiisocyanate with a diepoxide compound, are characterized by high softening points and resistance to oxidation and the solubilizing action of solvents. If in a particular case the formed resin precipitates out of solution during formation and/or the material is generally insoluble in common solvents and it is intended that the resin is to be used for coating purposes, then it can be advantageous to cause the reaction to proceed to an intermediate or prepolymer stage in solution, then apply the solution to a surface, and complete the polymerization by heating and drying the applied polymer to form a protective coating. Where molded articles are to be produced, it is undesirable to employ a solvent medium since it has all the obvious disadvantages which volatiles cause in molding operations. The process and polymers of the present invention are particularly amenable to molding operations since in most cases nothing more is required other than mixing the sulfuryldiisocyanate and polyepoxide and permitting the reaction medium to solidify to a resinous mass, without any problem of shrinkage or volatilization of residual components and the like.

The unusual combination of properties exhibited by the invention compositions is probably due to the unique arrangement of oxazolidone and sulfone groups in the molecules. It is to be noted that the chemical structure of the invention compounds cannot be easily degraded by contact with moisture or corrosive environments. Under severe moisture conditions some of the oxazolidone moieties may hydrolyze, but the effect will be simply to open the heterocyclic ring to form an acrylic chain without and scission of the polymer chains.

EXAMPLE 1

*Reaction of sulfuryldiisocyanate with 2,2-di(p-hydroxyphenyl) propane diglycidyl ether*

A solution of sulfuryldiisocyanate (1.96 grams, 0.013 mole) in 10 milliliters of dry benzene was added to a solution of 2,2-di(p-hydroxyphenyl)propane diglycidyl ether (5.38 grams, 0.016 mole) in 20 milliliters of benzene over a period of one minute. The solution was stirred at a temperature of 75° C. for one hour and then the solvent was removed by distillation in vacuo. The residual product recovered was rubber-like in its properties. After drawing in an oven, the final product was a hard, tough resin which was soluble in dimethyl formamide and did not soften up to 360° C.

EXAMPLE 2

*Bulk polymerization of sulfuryldiisocyanate with 2,2-di (p-hydroxyphenyl)propane diglycidyl ether*

2,2-di(p-hydroxyphenyl)propane diglycidyl ether (2.93 grams, 0.0086 mole) was mixed with 0.1 milliliter of sulfuryldiisocyanate. The reaction mixture was stirred and heat evolution and gelation were evident. While the stirring was continued, 0.1 milliliter of sulfuryldiisocyanate was added three times. The reaction medium gradually stiffened and solidified into a resinous mass. The resin recovered has properties similar to those described in Example 1.

EXAMPLE 3

*Reaction of sulfuryldiisocyanate with dicyclopentadiene dioxide*

A solution of sulfuryldiisocyanate (1.06 grams, 0.0071 mole) in 10 milliliters of dry benzene was added to a stirring solution of dicyclopentadiene dioxide (1.17 grams, 0.0071 mole) in 10 milliliters of dry benzene. The addition was completed in fifteen minutes. After stirring the reaction mixture for forty-five minutes at 50° C. to 70° C., the solvent was removed by vacuum distillation and the product was recovered as a light tan resin. This resin was soluble in dimethyl formamide and did not soften below 260° C.

The reaction was repeated employing dioxane as a reaction medium, and the resinous product obtained was similar to that produced employing benzene as the reaction medium.

EXAMPLE 4

*Bulk polymerization of sulfuryldiisocyanate and dicyclopentadiene dioxide*

Sulfuryldiisocyanate [1.62 grams (90.2 percent), 0.01 mole] was added dropwise with stirring to dicyclopentadiene dioxide [2.12 grams (76.76 percent), 0.01 mole]. The reaction mixture gradually solidified into a resinous mass. The properties of the resin were similar to those described in Example 3.

EXAMPLE 5

*Reaction of sulfuryldiisocyanate with butadiene dioxide*

A solution of sulfuryldiisocyanate (3.44 grams, 0.023 mole) in 10 milliliters of dry benzene was added to a solution of butadiene dioxide (2.0 grams, 0.023 mole) in 20 milliliters of benzene. The reaction mixture was heated at a temperature of 50° C. and the formation of a solid became evident. After stirring for an additional two hours, the reaction mixture was stripped to dryness by distillation in vacuo. The recovered product was a white resin which was partially soluble in dimethylformamide, dimethylsulfoxide, benzene, methanol, acetone, and acetonitrile. Clear films were produced by casting a solution of soluble resin. The resin softened above a temperature of 205° C.

EXAMPLE 6

*Reaction of sulfuryldiisocyanate with vinylcyclohexene dioxide*

Sulfuryldiisocyanate (4.97 grams, 0.034 mole) was added to a stirring solution of vinylcyclohexene dioxide (4.92 grams, 0.035 mole) in 175 milliliters of dry dioxane. Evolution of heat and the formation of a resinous material was observed. After refluxing for two hours, the reaction mixture was stripped to dryness in vacuo. The product was a yellow resin which softened at 175° C. It was partly soluble in pyridine and was insoluble in common solvents.

EXAMPLE 7

*Reaction of sulfuryldiisocyanate with ethylene oxide*

In a dry box a flask was arranged with a dropping funnel, a gas inlet tube, Dry Ice cooling, and a stirring apparatus. The flask was flushed with dry nitrogen and about 10 milliliters (about 0.20 mole) of ethylene oxide was condensed in the flask after passing it through a calcium sulfate drying tower. Sulfuryldiisocyanate was added dropwise to the cooled reaction medium. The cooling was removed and the reaction mixture was allowed to gradually warm to room temperature. On standing, the solution became turbid and there was a slow precipitation of white solid. The solvent was removed in vacuo and there was obtained a viscous yellow oil in addition to the white solids which had previously precipitated. Addition of 15 milliliters of acetone dissolved away from the yellow material from the white solid material.

This product is useful as an intermediate for the production of polymers, and as a plasticizer for resins such as those described in the present invention.

EXAMPLE 8

*Reaction of sulfuryldiisocyanate with styrene oxide*

Styrene oxide (3.8 grams, 0.016 mole) in 175 milliliters of dry benzene were placed in a flask contained in a dry box. Sulfuryldiisocyanate (2.31 grams, 0.016 mole) was added with stirring. The reaction mixture warmed somewhat but remained clear and water-white. The reaction mixture was refluxed for one hour and then the benzene was removed yielding a clear yellow product which solidified into a hard material. The product softened at 145° C. and was soluble in acetone, chloroform, dimethylformamide, and tetrahydrofuran.

This product has utility as a chemical intermediate and in the manufacture of resins and plastics. (U.S. Patent No. 2,773,067.)

What is claimed is:

1. A process for producing (2-oxazolidon-3-yl)sulfone which comprises reacting sulfuryldiisocyanate with an epoxide compound, said epoxide characterized by having an oxygen atom attached to two adjacent carbon atoms.

2. A process which comprises reacting sulfuryldiisocyanate with a monoepoxide compound, said monoepoxide characterized by having an oxygen atom attached to two adjacent carbon atoms.

3. A process for producing resins which comprises reacting sulfuryldiisocyanate with a polyepoxide compound, said polyepoxide characterized by having at least two oxirane groups of the formula

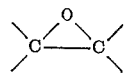

4. A polymerizable composition which comprises sulfuryldiisocyanate and a polyepoxide compound, said polyepoxide characterized by having at least two oxirane groups of the formula

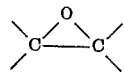

5. The process of claim 2 wherein the monoepoxide is styrene oxide.

6. The process of claim 2 wherein the monoepoxide is ethylene oxide.

7. The process of claim 3 wherein the polyepoxide is dicyclopentadiene dioxide.

8. The process of claim 3 wherein the polyepoxide is vinylcyclohexane dioxide.

9. The process of claim 3 wherein the polyepoxide is the diglycidyl ether of 2,2-di(p-hydroxyphenyl)propane.

10. The process of claim 3 wherein the polyepoxide is butadiene dioxide.

11. A process for producing resins which comprises reacting sulfuryldiisocyanate with a polyepoxide compound of the formula:

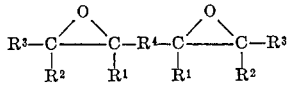

wherein: (a) each of $R^1$, $R^2$, and $R^3$ is a member selected from the group consisting of hydrogen, alkyl, cycloalkyl, aryl, alkaryl, aralkyl and alkenyl, each of said alkyl, cycloalkyl, aryl, alkaryl, aralkyl and alkenyl groups having up to 20 carbon atoms, and when $R^1$ and $R^2$ are not one of the above $R^1$ and $R^2$ taken together are alkylene of 3 to 4 carbon atoms which is part of a carbocyclic ring; and (b) $R^4$ is an aliphatic or aromatic group having up to 20 carbon atoms.

12. A polymerizable composition which comprises sulfuryldiisocyanate and a polyepoxide compound of the formula:

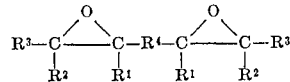

wherein: (a) each of $R^1$, $R^2$, and $R^3$ is a member selected from the group consisting of hydrogen, alkyl, cycloalkyl, aryl, alkaryl, aralkyl and alkenyl, each of said alkyl, cycloalkyl, aryl, alkaryl, aralkyl and alkeny groups having up to 20 carbon atoms, and $R^1$ and $R^2$, when not one of the above, taken together are alkylene of 3 to 4 carbon atoms which is part of a carbocyclic ring; and (b) $R^4$ is an aliphatic or aromatic group having up to 20 carbon atoms.

References Cited by the Examiner

UNITED STATES PATENTS 2,374,136  4/1945  Rothrock _____ 260—453
3,020,262  2/1962  Speranza _____ 260—47

OTHER REFERENCES

Chemical Abstracts, vol. 57, December 1962 (col. 14932g).

WILLIAM H. SHORT, *Primary Examiner.*

T. PERTILLA, *Assistant Examiner.*